United States Patent [19]
Adolph

[11] 3,873,626
[45] Mar. 25, 1975

[54] PURIFICATION OF BIS(2-FLUORO-2,2-DINITROETHYL)FORMAL

[75] Inventor: Horst G. Adolph, Beltsville, Md.

[73] Assignee: The United States of America as represented by the Secretary of the Navy, Washington, D.C.

[22] Filed: July 29, 1971

[21] Appl. No.: 168,505

[52] U.S. Cl. .............. 260/615 A, 149/88
[51] Int. Cl. ............................ C07c 43/30
[58] Field of Search .......... 149/88; 260/615 A, 702

[56] References Cited
UNITED STATES PATENTS

| | | | |
|---|---|---|---|
| 3,373,209 | 3/1968 | Glover | 149/88 X |
| 3,526,667 | 9/1970 | Hill et al. | 149/88 X |
| 3,531,534 | 9/1970 | Adolph | 149/88 X |
| 3,541,160 | 11/1970 | Kamlet | 149/88 X |

*Primary Examiner*—Leland A. Sebastian
*Attorney, Agent, or Firm*—R. S. Sciascia; J. A. Cooke

[57] ABSTRACT

Bis(2-fluoro-2,2-dinitroethyl)formal is purified by contacting impure bis(2-fluoro-2,2-dinitroethyl)formal dissolved in an inert solvent with an acidic dichromate solution.

10 Claims, No Drawings

PURIFICATION OF BIS(2-FLUORO-2,2-DINITROETHYL)FORMAL

BACKGROUND OF THE INVENTION

This invention relates generally to a method of purification and more particularly to a method of purifying bis(2-fluoro-2,2-dinitroethyl)formal which finds use as an energetic plasticizer in explosive compositions.

Bis(2-fluoro-2,2-dinitroethyl)formal, hereinafter referred to as FEFO, is prepared by two different procedures using either 2-fluoro-2,2-dinitroethanol or bis(2,-2,2-trinitroethyl)formal as starting materials. The 2-fluoro-2,2-dinitroethanol is reacted with formaldehyde to obtain FEFO according to the procedure disclosed in U.S. Pat. No. 3,526,667 issued Sept. 1, 1970 to Marion E. Hill and Kathryn G. Shipp entitled "Process for Acetal Preparation." On the other hand, the bis(2,2,2-trinitroethyl)formal is converted to FEFO by the procedure disclosed in "Fluorodinitroaliphatics II" by Mortimer J. Kamlet and Horst G. Adolph, Journal of Organic Chemistry 33, 3073 (1968). When prepared by either of these methods, the purification generally involves washing with sulfuric acid and aqueous sodium hydroxide followed by treatment with adsorbents such as charcoal and Celete to yield a product with a purity between 95–97%. It has been found that the main impurity in FEFO prepared by either method is the oxymethylene homolog, 1,9-difluoro-1,1,9,9-tetranitro-3,5,7-trioxanonane, which is less thermally stable than FEFO and tends to downgrade the thermal stability of the FEFO. Further purification of FEFO has in the past been achieved by low-temperature recrystallization and/or molecular distillation. However, neither process is very efficient in purifying FEFO with losses of FEFO in the area of 20–25% encountered in the recrystallization process. Furthermore, distillation also requires that FEFO be treated in the neat state and both methods involve steps that must be carried out after completion of the initial manufacturing processes rather than during the processes.

SUMMARY OF THE INVENTION

Accordingly, one object of this invention is to provide a method for purifying FEFO from its oxymethylene homolog.

Another object of this invention is to provide a method for purifying FEFO from its oxymethylene homolog which minimizes loss of FEFO.

A still further object of this invention is to provide a method for purifying FEFO from its oxymethylene homolog which can easily be performed during the conventionally established processes for manufacturing FEFO.

A further object of this invention is to provide a method for purifying FEFO from its oxymethylene homolog which eliminates the need for handling neat FEFO.

These and other objectives are accomplished by providing a process for the purification of FEFO from its oxymethylene homolog comprising contacting unpurified FEFO dissolved in an inert solvent with an acidic dichromate solution.

DESCRIPTION OF THE PREFERRED EMBODIMENT

The instant process for the purification of FEFO from its oxymethylene homolog involves the treatment of a solution of crude FEFO in an inert solvent, such as, for example, methylene chloride or ethylene chloride, with a solution of dichromate, preferably sodium dichromate or potassium dichromate in an acid, preferably a relatively strong acid such as, for example, sulfuric acid (preferably 70–90%), phosphoric acid, perchloric acid, nitric acid, trifluoroacetic acid or any other relatively strong acid which is not attacked by dichromate. Under these conditions, it has been found that the oxymethylene homolog in FEFO is degraded almost exclusively by the dichromate. With respect to this degradation, it should be noted that if the acid strength becomes too great, FEFO will be attacked so that the use of sulfuric acid of greater than 90% or the use of other acids which would be as strong as sulfuric acid of greater than 90% is not recommended. Furthermore, although temperature is not a critical factor, it is preferred to conduct said purification at about room temperature since higher temperatures are not required to successfully conduct the purification and this would eliminate unnecessary heating and cooling operations. The degredation products are subsequently removed by washing the dichromate-treated solution of FEFO with dilute agueous base. It has also been found that other unidentified trace impurities in FEFO are also removed by this treatment. This treatment greatly increases the thermal stability of FEFO.

The general nature of the invention having been set forth, the following example is presented as a specific illustration thereof. It will be understood that the invention is not limited to this specific example but is susceptible to various modifications that will be recognized by one of ordinary skill in the art.

EXAMPLE

A solution of 300g of bis(2-fluoro-2,2-dinitroethyl)-formal (purity by glpc ca. 96%, containing 2.5–3% of its oxymethylene homolog 1,9-difluoro-1,1,9,9-tetranitro-3,5,7-trioxanonane) in 1,200 ml of methylene chloride was added at room temperature to a well-stirred solution of 8g of sodium dichromate dihydrate in 300 ml of 85 weight percent sulfuric acid. The reaction mixture was agitated with an efficient stirrer until the dichromate was completely consumed as indicated by the disappearance of the red-brown color in the methylene chloride layer (ca. 1.5–2 hrs). The organic phase was separated from the sulfuric acid layer, washed once with water, then with three 500 ml portions of 25% aqueous sodium hydroxide solution and finally with water. After drying over magnesium sulfate, the solvent is removed under vacuum leaving 278g of bis(2-fluoro-2,2-dinitroethyl)formal which contained less than 0.3% of the oxymethylene homolog as indicated by gas liquid phase chromatography.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. The method of purifying bis(2-fluoro-2,2-dinitroethyl)formal from a mixture comprising bis(2-fluoro-2,2-dinitroethyl) formal and its oxymethylene homolog 1,9-difluoro-1,1,9,9-tetranitro-3,5,7-trioxannonane comprising:

contacting said mixture in an inert solvent with dichromate which is dissolved in a relatively strong acid solution which is not attacked by dichromate.

2. The method of claim 1 further including the step of separating said bis(2-fluoro-2,2-dinitroethyl)formal from the reaction solution.

3. The method of claim 1 wherein said dichromate is provided by a reagent selected from the group consisting of sodium dichromate and potassium dichromate.

4. The method of claim 2 wherein said dichromate is provided by a reagent selected from the group consisting of sodium dichromate and potassium dichromate.

5. The method of claim 3 wherein said dichromate is provided by sodium dichromate.

6. The method of claim 4 wherein said dichromate is provided by sodium dichromate.

7. The method of claim 1 wherein said relatively strong acid is selected from the group consisting of sulfuric acid, phosphoric acid, perchloric acid, nitric acid and trifluoroacetic acid.

8. The method of claim 2 wherein said relatively strong acid is selected from the group consisting of sulfuric acid, phosphoric acid, perchloric acid, nitric acid and trifluoroacetic acid.

9. The method of claim 1 wherein said relatively strong acid is 70–90% sulfuric acid.

10. The method of claim 1 wherein said relatively strong acid is 85% sulfuric acid.

* * * * *